Figure 1:
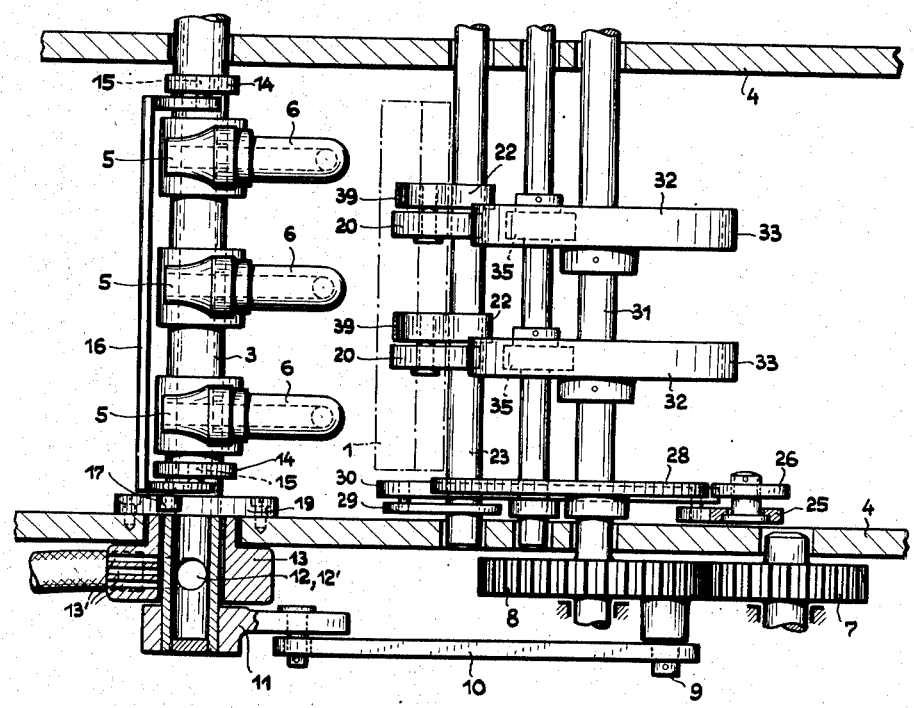

Jan. 18, 1955   G. MEYER-JAGENBERG ET AL   2,699,712
METHOD AND MECHANISM FOR UNFOLDING, REFOLDING, SETTING-UP
AND TRANSPORTING CARTONS IN SPACED RELATIONSHIP
Filed Nov. 19, 1953                              4 Sheets-Sheet 2
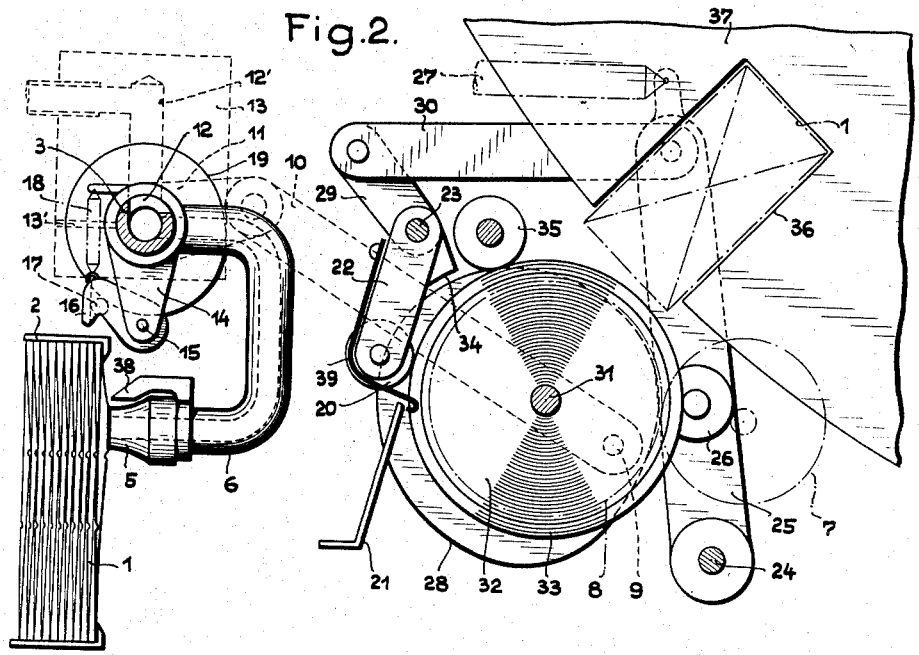
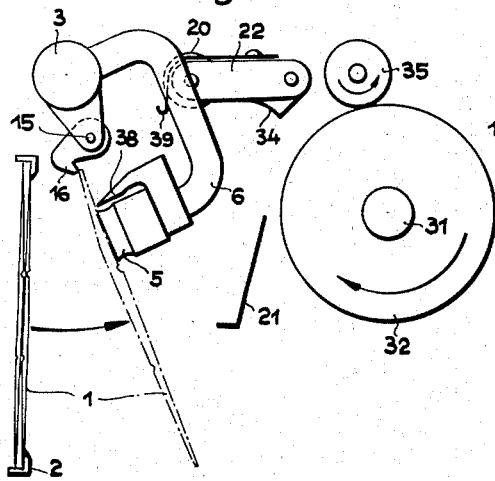
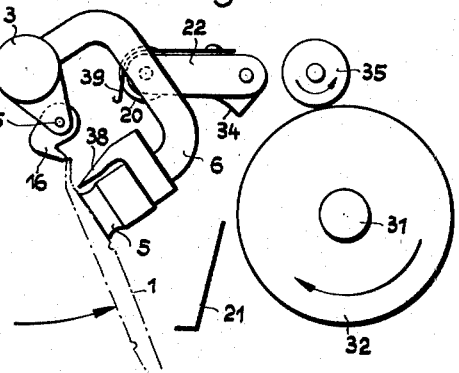
Inventors
G. Meyer-Jagenberg
W. Drese
H. Welsch Inventors
G. Meyer-Jagenberg
W. Drese
H. Welsch Jan. 18, 1955   G. MEYER-JAGENBERG ET AL   2,699,712
METHOD AND MECHANISM FOR UNFOLDING, REFOLDING, SETTING-UP
AND TRANSPORTING CARTONS IN SPACED RELATIONSHIP
Filed Nov. 19, 1953   4 Sheets-Sheet 4
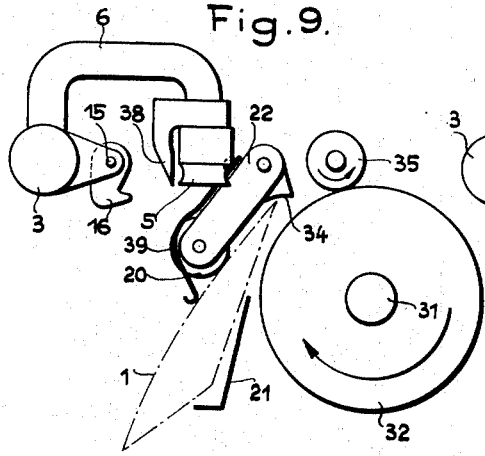
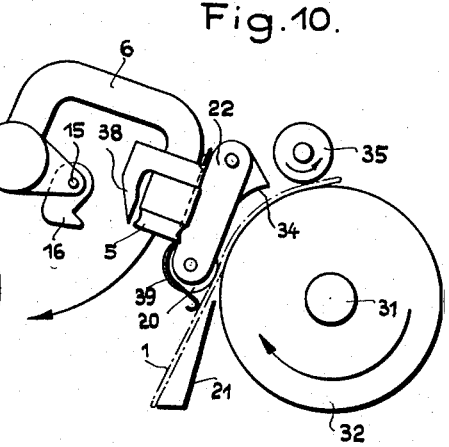
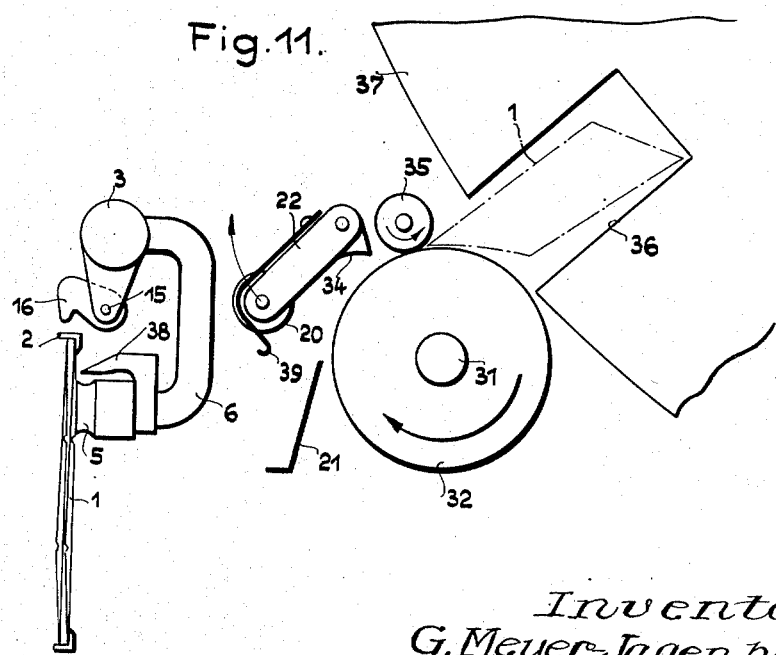
Inventors
G. Meyer-Jagenberg
W. Drese
H. Welsch
By Glascock Downing Seibold
Attys.

United States Patent Office 2,699,712
Patented Jan. 18, 1955

2,699,712

METHOD AND MECHANISM FOR UNFOLDING, REFOLDING, SETTING-UP, AND TRANSPORTING CARTONS IN SPACED RELATIONSHIP

Gunther Meyer-Jagenberg, Dusseldorf-Grafenberg, Wilhelm Drese, Dusseldorf, and Hans Weisch, Dusseldorf-Oberkassel, Germany, assignors of one-half to Jagenberg-Werke Akt.-Ges., Dusseldorf, Germany Application November 19, 1953, Serial No. 393,120

Claims priority, application Germany November 27, 1952

13 Claims. (Cl. 93—53)

The present invention relates to the art of handling cartons and particularly tubular cartons.

More particularly, the invention relates to a method and mechanism for unfolding, refolding, setting up and transporting tubular cartons in spaced relationship.

Specifically the invention relates to an improved method and mechanism for effecting the removal of carton blanks from a stack of blanks, manipulating the same through a series of steps providing for unfolding the blank from its flattened condition, refolding the blank into a reversely flattened condition and moving the carton to a spacing conveyor arrangement in a manner permitting the carton to automatically set itself up into an opened condition so that a series of cartons continuously move through the various steps embodied in the mechanism in an effective manner.

Specifically, the present invention relates to a method and mechanism for spacing, unfolding, refolding, setting up and conveying tubular cartons in spaced relationship in which the pre-opening of the flattened blank is definitely assured so that the subsequent unfolding is properly effected.

In the art of handling cartons involving manipulation of a blank that has been cut, scored, flattened, and glued so that the tubular carton is in flattened condition it has been known to partly or entirely remove folded cartons from the front plane of a stacker mechanism and to preliminarily open the same by suction heads in order to permit the introduction of a mandrel or blade into the carton and by a subsequent swinging or rotating movement of the carton relative to the blade effect setting up of the carton. It is obvious that in such arrangement the reciprocation of the suction head in accordance with its working cycle as well as the timed and synchronized insertion of the mandrel or blade into the preliminarily opened carton will impose limitations upon the mechanism as regards the speed of operation thereof. Additionally, the immediate aforedescribed arrangement does not always effect a sufficient pre-opening of the carton to ensure that the blade or mandrel can be positively and properly inserted.

A similar disadvantage as regards speed of operation is attendant in other known arrangements in which suction heads are applied to either side of the carton plane since in order to permit of the attachment of the suction heads to the cartons or the gripping of the cartons, the flattened carton has to be, in the known mechanisms, completely removed from the front face of the stacker and at least one of the suction heads must perform a reciprocating movement according to the direction of opening movement of the carton.

It is also known to have an arrangement in which the suction elements or heads travel in a reciprocatory path and grip a carton blank and deliver or move by the motion of the head, that portion of the blank projecting beyond the head or nozzle into the range of or engagement with abutments, thus effecting the setting up of the carton along the score or crease lines. This arrangement, however, does not guarantee a positive pre-opening nor the subsequent erection of the tubular carton. To the contrary, a deformation and adhesion of the contacting surfaces of the blank may occur particularly if the carton blanks have been stacked and in storage for a considerable period of time. Such difficulties also occur if the blank is of a very thin and thus very flexible material.

In any event, in order to have an undisturbed and proper process of manipulating the blank through the various stages until it has set itself up on the conveyor it is essential, in instances where suction head or heads engage the blank only one side thereof, that a reliable initial pre-opening of the flattened blank be effected. In other words, it is most important that the two contacting sides of the flattened blank be moved apart or detached from one another by only a few millimeters in the initial stages of the unfolding. It follows that if the blank can be properly pre-opened the setting up of the blank along the crease lines, that is those lines that define the carton panels, will generally occur without too much difficulty.

Therefore, the present invention has for an object to provide in a method and mechanism for handling the manipulating cartons, the removal of a flattened blank from a stacker and manipulation of the same through stages until the cartons are set up and conveyed away in spaced relationship, which stages include unfolding, a reverse refolding, and automatic setting up that is incorporated with a simultaneous arrangement of the set up cartons in spaced relationship on a conveyor for removal and subsequent handling and in which the carton blank after it has been initially removed from the stack is deflected in the direction of removal to ensure an effective and proper pre-opening.

Specifically, the invention has for an object to provide an arrangement in which the flattened blank is grasped by a suction head or heads movable through an arc about an axis parallel with the plane of the flattened blank while the blank is on the stack but which axis is to one side of the stack and in which, during the swinging movement of the suction head or heads, the edge of the blank adjacent the axis of swing of the head is positively deflected toward the direction of the swinging movement and which deflection effects an initial pre-opening of the blank so that its subsequent setting up along the score lines or lines of fold is readily effected.

Additionally, the present invention has for an object to provide a mechanism in which the blank after having been set up is released from the suction head or heads and additional means effect the reverse reflattening of the blank while simultaneously conveying the same to the cells of a spacing conveyor or some other suitable conveying means.

In order to effect the proper pre-opening of the blank, in accordance with the present invention, the flattened blank is grasped by one or more suction heads which move the blank away from the stack. During the initial movement of the blank away from the stack, the suction head or heads has seized the blank between one longitudinal edge thereof and the adjacent score line that limits one panel face of the finished carton. Thus the head is cooperating with the blank inwardly of the longitudinal edge. During the forward motion of the carton, while grasped by the suction head or heads, that portion of the blank between the head and adjacent longitudinal edge would be deflected along its entire extent in the direction of the forward motion of the carton. This deflection will bend the projecting portion of the carton out of the plane of the suction area and will thus form an obtuse angle between the deflecting surface and the surface attached to the suction head. This will result in the narrowing of the extent of the carton blank facing the direction of motion. In effecting this preliminary deflection, it is of particular advantage that the suction head or heads seize the carton surface, which has a double layer, that is that panel which has been overlapped and glued to form a longitudinal seam of the finished carton so that due to the increased strength of this double layer section the efficient operation of the suction head or heads is ensured.

The deflection of the carton blank along its longitudinal edge that is adjacent to the head or heads results in a positive detachment of the facing surfaces of the blank from one another. This is due to the various directions of pressure and traction and to the difference of tension thus caused between the carton area facing the direction of removal motion and the opposite area of the carton, this diversity of motions initiating the proper pre-opening.

As the manipulation proceeds, the carton blank still in the grasp of the suction head or heads is moved forwardly so that the longer portion of the blank projecting beyond the suction area and on the side of the area opposite the edge that has been deflected will likewise be moved relative to the plane defined by the suction area but in the direction opposite to the forward motion of the carton. This movement effects complete setting up or unfolding of the carton. After the carton has been erected or set up, it passes into the sphere of operation of the mechanism that ensures its reverse refold and delivery to conveyor means as set forth hereinafter.

In order to effect the foregoing method of unfolding and refolding the carton, the present invention utilizes simple structural means which executes only short working strokes and includes as essential components suction means for detaching and advancing the flattened carton blank out of the stack or magazine and coordinated with this advancing motion a bending bar engages the removed blank adjacent the edge that is nearest the suction area, and which is the smallest portion of the blank projecting beyond the suction area, to deflect this small portion of the blank in the direction of the forward motion of the carton but which deflection places the said longitudinal edge of the carton in advance of the suction area.

With the further forward motion of the blank and the increasing deflection of the smaller projecting portion of the blank, the major portion of the blank that projects on the opposite side of the suction area will be deflected out of the plane of the suction area in the direction opposite to the forward motion by a fixed stop provided in the path of movement of the carton so that the carton which has been pre-opened by the initial deflecting action will be fully set up or erected in its continued forward motion.

The refolding of the erected carton into its reverse flattened condition is effected by a freely rotating pressure roll carried by a swinging lever that swings about an axis parallel to the axis of swing of the suction head or heads and which roll contacts the panel face that had been previously held by the suction means and in swinging motion of the roll reflattens the blank against a driven feed roller means which convey the reflattened blank to a spacing conveyor where the blank automatically sets itself up due to its inherent elasticity.

Specifically, therefore, the present invention provides a first swingable means embodying a suction head or heads that removes the end blank from the stack and conveys the same toward a fixed stop plate, a second swingable means constituting a bending bar swingable about an axis parallel to the axis of the swing of the suction heads but correlated with the swing of the suction heads in such fashion that the trailing edge of the blank, in relation to its direction of movement, is bent forwardly relative to the direction of movement to pre-open the blank before it strikes the fixed abutment, the deflection is continued until the blank is substantially opened and as soon as the blank is open the suction is released and another swingable means swinging in the opposite direction reversely flattens the blank against a feed roll means. Additional means are provided to guide the reflattened blank into the bite of the feed roll and a further roll means so that the reversely flattened blank is fed to a spacing conveyor. In this particular example described hereinafter, the spacing conveyor is provided with cells in which the blank automatically sets itself up.

Further and more specific objects will be apparent from the following description of the invention taken in connection with the accompanying drawings in which Figure 1 illustrates one form of the invention partly in side elevation and partly in section, Figure 2 is a plan view of the invention partly in section, and Figures 3 to 11 illustrate diagrammatically the successive positions of the mechanism during the manipulation of a carton blank.

With reference to the drawings, the tubular flattened carton blanks 1 are supported in pack formation in a magazine or stacker 2. This structure is conventional and supports a considerable number of individually collapsed blanks disposed vertically and stacked together. Outer ends of the magazine have lips forming pack or stack retainers and suitable pack advancing means, not shown, effects the feed of the stack or pack as the successive blanks are removed. Adjacent the magazine is a vertically disposed hollow shaft 3 that is rotatably supported in the bearing plates 4. This hollow shaft 3 carries, in the present example, three suction arms 6 each provided with a suction nozzle 5. The suction arms 6 are hollow and communicate with the space within the hollow shaft 3. The swinging motion of this shaft, within a range of swing of substantially 90°, is effected by a driving gear 7 which in turn rotates gear 8 and crank mechanism 9, 10 and 11. The crank pin 9 is carried by the gear 8, the connecting rod 10 is fastened at one end of the crank and its other end to a pin projecting from a lever 11 that is firmly connected to the lower end of the axle 3. That portion of the hollow shaft between the lower surface of the lower bearing plate 4 and the lever 11 is provided with an aperture 12 which is enclosed by a stationary casing 13. The casing 13 communicates over the air-pipe 12' with a partial vacuum producer, not shown, and cooperates with the opening 12 so that in the position of the shaft 3 and the suction arms 6 as shown in Fig. 2 the interior space of the shaft 3 communicates with the partial vacuum generator in order to take off the blank 1 and in the position shown in Fig. 8 the interior space of the shaft 3 communicates over the pipes 13' with the outside air in order to release the blank 1.

Fastened to the shaft 3 and respectively above and below the suction arms 6 are a pair of levers 14 which support the bending bar or ledge 16 for rotation about pivots 15. To effect the movement of the bending bar 16, a follower roll 17 is carried by the lower end of the bending bar for cooperation with a fixed cam 19. A tension spring 18 holds the follower roll and thus the bending bar against the surface of the cam so that when the shaft 3 rotates to swing the suction means including the arms 6 and the nozzles 5 the cooperation of the roller 17 with cam 19 ensures that the bending bar forms a relative motion with regard to the forward motion of the suction arms so that the bending bar 16 advances in relation to the forward motion of the suction heads 5. In order to provide a support for the deflection of the edge of the carton blank acted on by the bending bar 16, during pre-opening of the flattened blank, fixed stops 38 are mounted on each suction arm 6. The function of these stops will be set forth hereinafter during the description of the cycle of operations.

The aforegoing components, namely the rotatable shaft, suction arms, suction heads, bending bar and its control cam, constitute means to remove flattened successive carton blanks 1 from out of the magazine 2 and to pre-open these blanks. The components hereinafter described constitute the means for completing the setting up of the carton, the reverse reflattening thereof and the delivery of the carton to the conveying means and during which delivery the carton automatically sets itself up.

To effect these latter operations two pressure rolls 20 are provided for swinging motion to and fro parallel with the path of motion of the suction components 6 and 5. The pressure rolls in cooperation with the fixed stop plate 21 reversely reflatten the carton. The rolls 20 are supported for free rotation on the ends of levers 22. The levers 22 are fixed to a shaft 23 that is rotatably arranged in the bearing plates 4. The shaft 23 is parallel to shaft 3 and in alignment therewith. In order to swing the lever 22, a roll carrying lever 25 is mounted for swinging movement about a fixed pivot 24. The roll 26 carried by lever 25 is pressed by means of traction springs 27 against the cam 28. The end of the lever 25 is connected to one end of a connecting rod 30, the other end of which is connected to a lever 29 which is fastened to shaft 23. The control cam 28 is mounted on shaft 31 which also carries gear 8. This shaft 31 is also supported in the bearing plates 4 and which is arranged parallel to the previously mentioned shafts. It is thus apparent that when the gear 8 is rotated to turn shaft 31 the movement of the shaft rotates cam 28. The surface of the cam imparts movement to lever 25 in opposition to the force of spring 27 so that when lever 25 moves to the right as shown in the drawings it draws connecting rod 30 to the right to rock lever 29 and thus shaft 23 clockwise. The clockwise rocking of shaft 23 imparts similar movement to the levers 22 and thus the rolls 20 carried thereby. The spring 27 forces the lever 25 to assume positions determined by the surface of cam 28.

Also mounted on shaft 31 and at about the same level as pressure rolls 20 are a plurality of conveyor discs 32 each provided with an elastic covering 33 of rubber or the like. The discs 32 and 33 constitute conveyor discs and cooperating draw rollers 35 are mounted on another shaft that is parallel with the shaft 31 so that the tubular cartons 1 that have been reversely reflattened by the action of the pressure rolls 20 and switch plate or abutment 21 are guided by means of a guide member or switch 34 carried by each lever 22 into the bite of the draw rollers and conveyor discs. The draw rollers press the reversely flattened blank against the periphery of the conveyor discs and cooperate with the conveyor discs to move the cartons to the cells 36 of the conveying means 37. Fixed to the levers 22 that support the pressure rolls 20 are elastic stop members 39 which press against the underlying wide panel of the carton after the narrow panel adjacent the same has been released from the grip of the suction heads or nozzles. The elastic stop means 39 which can be spring members prevent the recoil of the erected carton, that is prevent the blank resuming its original form.

The various stages of operation for manipulation of successive and flattened carton blanks is shown in Figures 2–11. In Fig. 2, the suction heads 5 and suction arms 6 are in communication with the partial vacuum generator and will move, during swinging of shaft 3, the foremost flattened blank 1 out of the magazine 2 into the position shown in Figure 3. The levers 22 which carry pressure rolls 20 will have returned to their starting or upper position. It is pointed out that the blank is the type which includes opposite narrow panels and opposite wide panels and the length of the arms 6 in relation to the position of the shaft 3 and the magazine 2 is such that the suction heads 5 contact successive blanks inwardly of the longitudinal edge of the blank and along the score line that separates the narrow panel from the wide panel in relation to the front face of the blank. Thus a portion of the narrow panel seized by the suction heads and the adjacent wide panel that is on the rear of the plane of the flattened blank projects beyond the suction head 5 on the side of shaft 3. The major portion of the blank projects on the opposite side of the suction heads 5. During the initial swinging motion of the suction means and shaft 3, the levers 14 carried by the shaft move forwardly and the bending bar 16 through the cooperation of the roll 17 carried thereby with fixed cam 19 effects an independent swinging motion around the pivots 15. Due to the relative motion of bending bar 16 with respect to the forward motion of the suction heads 5, the smaller portion of the carton blank that projects toward the shaft 3 will be deflected as shown in Figure 4 so as to pre-open the tubular blank. The edge to be deflected will be defined by the stops 38 fixed to suction arms 6. These stops 38 ensure the effective turning off or deflection of the carton around the edges of the suction nozzles since the latter are yieldable and are generally made of rubber or the like. Thus the stop 38 limits any deflection of yieldable nozzle 5 and ensures the deflection of the portion of the blank pressed against by the bar 16.

Figure 5:
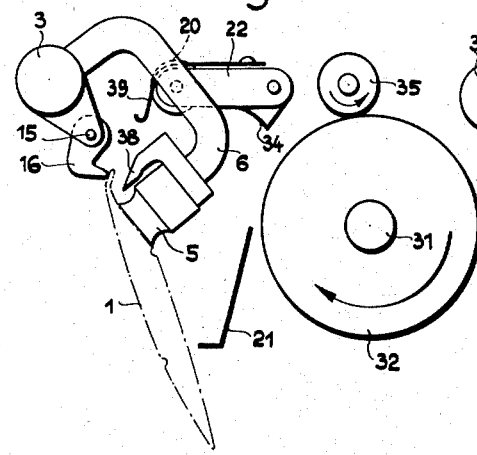
Figure 6:
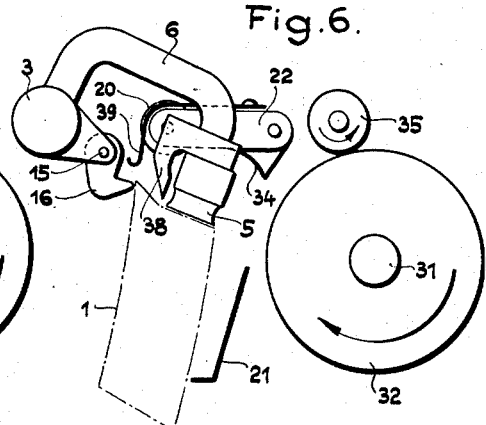

During the further swinging motion of the suction arms 6, the bending bar 16 further advances with regard to the forward motion of suction arms 5 and 6 so as to increase the deflection of the small projecting portion of the carton so that the longitudinal edge thereof projects beyond the plane of the suction area with regard to the forward motion of the suction arms 6. The carton is now pre-opened. The major portion of the carton that projects beyond the opposite side of the suction heads or area will, as shown in Figure 5, be pressed against a fixed stop plate 21 so that the continuing swinging motion of the carton, in the grasp of the suction heads, effects a substantially complete erection of the carton.

Figure 7:
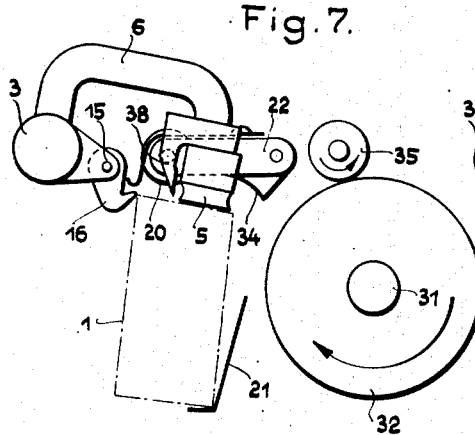
Figure 8:
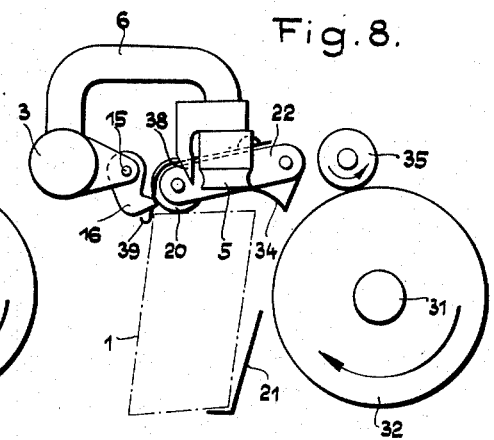

Shortly before reaching the final position shown in Figure 8, the narrow panel of carton 1 as opposed to the narrow panel that has been grasped by the suction head nozzles 5 rests upon the short arm of the stop plate 21 as shown in Figure 7. This stop plate 21 thus functions as a back stop for the reverse flattening stage. As noted in Figure 7, the bending ledge or bar as passed by the adjacent edge of the now open blank and levers 22, are moving toward the now open carton. When the Figure 8 position is reached, the suction is released and the pressure rolls 20 engage the narrow panel of the carton that has just been released from the suction. At the same time, the elastic stop members 39 pass behind the adjacent wide panel of the carton to prevent recoil of the carton. It is to be noted that in the Figure 8 position, the angular stop plate 21 supports one corner of the carton and the diagonally opposite corner also is, in effect, angularly supported by the elastic stop arm 39 and the rolls 20. Upon continued forward motion of levers 22 and thus pressure rolls 20, the carton supported by the plate 21 will be reversely folded as shown in Figure 9. During this flattening and reverse folding, the carton is applied against the continuously rotating conveyor discs 32 and 33. The reversely reflattened carton is moved forward by these discs and deflected and guided by the guide member or switch 34 into the range of action of the draw rolls 35, as shown in Figure 10.

The now reflattened blank seized in the bite of the rolls 35 and conveyor discs 32 and 33 is fed forward into the cells 36 of the conveyor means 37. As indicated in Figure 11, the carton automatically sets itself up to its fully opened condition in these cells 36. The drive mechanism in the meantime, as shown in Figure 11, has moved the suction arms 6 back to grasp the next blank while the levers 22 are being moved to an inoperative position.

It is thus believed clear that this invention provides an arrangement in which successive flattened blanks each embodying alternate narrow and wide panels are seized by swinging suction means that cooperate with a narrow panel and swung forwardly out of the magazine. During this swinging motion, a bending bar engages against the edge of the wide panel of the flattened blank that is adjacent the narrow panel seized by the suction means but on the opposite side of the plane of the flattened blank. This bending bar swings in the direction of the swinging motion of the seized blank but relative to this swinging motion to deflect the projecting portion of the blank forwardly of the plane of the suction area to pre-open the blank. Continued swinging motion of the seized blank presses the wide panel adjacent the seized narrow panel against a fixed plate whereupon the continued swinging motion effects the full opening of the blank. The now open carton is released from the suction and a swinging roller engages the now released narrow panel to press the opened blank against the stop plate to reversely reflatten the blank. The reflattening of the blank presses the same against the conveying discs to feed the blank forwardly while guide means again deflect the reflattened blank into the bite of counterdiscs so that the reversely reflattened blank is fed to the cells of the conveyor and during this feeding motion and after release from the conveyor discs and counterdiscs, the blank automatically sets itself up. Stop means are associated with the arms that carry the suction heads to ensure the deflection of the narrow projecting portion of the blank by the bending bar and further stop means in the form of spring members or the like are associated with levers carrying the pressure rolls to cooperate with the wide panel adjacent the released narrow panel and which is the rearmost wide panel in relation to the direction of the forward movement of the carton to prevent recoil of the carton when it is released from the suction. It is thus clear that only swinging motions are embodied in the mechanism of this invention. The suction arms swing to and fro about a fixed point, the bending bar swings to and fro about an axis that moves in an arc that is coaxial with the pivot point of the suction arms and the pressure rolls swing about an axis parallel to the axis of swing of the suction arms but in the opposite direction. The arrangement ensures the effective pre-opening of the blank, the full opening or the setting up of the blank to its carton form, adequately prevents recoil while properly reversely reflattening the carton to blank form and conveying the reversely reflattened suitable conveying means while permitting the blank to automatically set itself up in open condition.

While the present embodiment has been described and illustrated with relation to a mechanism in which the axis of the shaft 3, rolls 32 and levers 22 are vertical, it is believed clear that the invention is susceptible to reduction of practice when the various axes are disposed horizontally.

Having now described an embodiment of the inven- tion, what is desired to be secured by Letters Patent in the United States is:

1. In the continuous squaring of successive collapsed flattened carton blanks of a pack of blanks the improvements comprising grasping the end blank on the exposed side of the flattened plane and between opposite edges of the blank, moving the grasped blank forwardly of the pack and during the forward motion and while retaining the grip on the blank deflecting one edge portion forwardly in relation to the forward direction of movement and deflecting the opposite edge portion rearwardly with relation to the forward direction of movement to successively pre-open and then set up the blank to carton form.

2. In the continuous squaring of successive flattened carton blanks of a pack of blanks the improvements comprising grasping the end blank of the pack on the exposed side thereof and between opposite marginal edges at an area nearer one edge than the other so that a small portion of the blank projects beyond one side of the grasped area and a larger portion projects beyond the opposite side of the grasped area, moving the grasped blank forwardly of the pack and during the forward motion deflecting the projecting small portion of the blank forwardly of the grasped area and subsequently and while maintaining the grip on the blank and continuing the deflection of the small portion deflecting the larger portion of the blank in a direction opposite the forward motion of the blank to successively pre-open the blank and initially square the carton.

3. A method of squaring collapsed or flattened carton blanks comprising feeding a stack of successive blanks of the type embodying opposite wide and narrow panels and which in flattened condition have a wide and narrow panel flattened adjacent one another on opposite front and rear sides of the plane of the flattened blanks in relation to the direction of feed and which panels on each side of the said plane originally contact one another, grasping the narrow panel of the end blank of the stack on the front side of the plane containing the flattened blank and at an area adjacent its juncture with the adjacent wide panel on the said front side while leaving a small portion of the said narrow panel and the contacting wide panel projecting beyond one side of the grasped area and the larger portion of the blank projecting beyond the opposite side of the grasped area, moving the grasped blank forwardly of the stack and during the forward motion of the grasped blank applying deflecting bending pressure against the wide panel on the rear side of the plane of the flattened blank that contacted the grasped narrow panel and deflecting the portion of the grasped narrow panel and contacting wide panel that projects beyond the said one side of the grasped area forwardly of the grasped area of the said narrow panel to pre-open the blank and subsequently and while maintaining the grip on the blank and continuing the forward movement thereof and the deflection of the projecting small portion of the blank deflecting the larger portion of the blank that projects beyond the opposite side of the grasped area in a direction opposite the forward motion of the blank to initially square the carton.

4. A method of squaring collapsed or flattened carton blanks comprising feeding a stack of successive blanks of the type embodying opposite wide and narrow panels and which in flattened condition have a wide and narrow panel flattened adjacent one another on opposite front and rear sides of the plane of the flattened blanks in relation to the direction of feed and which panels on each side of the said plane originally contact one another, grasping the narrow panel of the end blank of the stack on the front side of the plane containing the flattened blank and at an area adjacent its juncture with the adjacent wide panel on the said front side while leaving a small portion of the said narrow panel and the contacting wide panel projecting beyond one side of the grasped area and the larger portion of the blank projecting beyond the opposite side of the grasped area, swinging the grasped blank forwardly of the stack so that the blank moves in an arcuate path, during the forward motion of the grasped blank applying deflecting bending pressure against the wide panel on the rear side of the plane of the flattened blank that contacted the grasped narrow panel and deflecting the portion of the grasped narrow panel and contacting wide panel that projects beyond the said one side of the grasped area forwardly of the grasped area of the said narrow panel to pre-open the blank and subsequently and while maintaining the grip on the blank and continuing the forward movement thereof and the deflection of the projecting small portion of the blank, abutting the wide panel that is adjacent the grasped narrow panel and on the front side of the plane of the flattened blank to deflect the larger portion of the blank that projects beyond the grasped area in a direction opposite the forward motion of the blank to initially square the carton.

5. A method of squaring collapsed or flattened carton blanks comprising feeding a stack of successive blanks of the type embodying opposite wide and narrow panels and which in flattened condition have a wide and narrow panel flattened adjacent one another on opposite front and rear sides of the plane of the flattened blanks in relation to the direction of feed and which panels on each side of the said plane originally contact one another, grasping the narrow panel of the end blank of the stack on the front side of the plane containing the flattened blank and at an area adjacent its juncture with the adjacent wide panel on the said front side while leaving a small portion of the said narrow panel and the contacting wide panel projecting beyond one side of the grasped area and the larger portion of the blank projecting beyond the opposite side of the grasped area, moving the grasped blank forwardly of the stack and during the forward motion of the grasped blank applying deflecting bending pressure against the wide panel on the rear side of the plane of the flattened blank that contacted the grasped narrow panel and deflecting the portion of the grasped narrow panel and contacting wide panel that projects beyond the said one side of the grasped area forwardly of the grasped area of the said narrow panel to pre-open the blank, subsequently and while maintaining the grip on the blank and continuing the forward movement thereof and the deflection of the projecting small portion of the blank deflecting the larger portion of the blank that projects beyond the opposite side of the grasped area in a direction opposite the forward motion of the blank to initially square the carton, releasing the grip on the grasped narrow panel, immediately thereafter applying collapsing pressure on the released narrow panel at an area adjacent its juncture with the wide panel that originally contacted it and was on the rear side of the plane of the flattened blank and applying backing pressure to the carton on the opposite narrow panel and along the wide panel originally on the front side of the plane of the flattened blank to reversely reflatten the blank, feeding the reflattened blank forwardly while applying pressure to opposite sides thereof and finally releasing the reflattened blank permitting the same to automatically set itself up in a squared condition in an effort to resume its original flattened condition.

6. In mechanism for removing flattened tubular carton blanks from a stack and opening, reflattening, squaring and conveying same, the improvements comprising a movable grasping means for grasping the end blank of a stack at an area inwardly of one edge of the flattened blank so that a portion of the blank projects beyond opposite sides of the grasping area, means for moving the grasping means toward and away from the stack to move the successive end blanks forwardly of the stack, a movable bending bar movable with the grasping means, means for moving said bending bar during movement of the grasping means so that the bar engages behind the blank at one side of the grasped area to bend the engaged portion of the blank forwardly of the plane of the grasped area in relation to the direction of movement of the blank whereby the blank is effectively pre-opened.

7. In mechanism for removing flattened tubular carton blanks from a stack and opening, reflattening, squaring and conveying same, as claimed in claim 6, and means in the path of movement of the grasped blank for engaging the blank at the other side of the grasped area for bending the blank rearwardly with relation to the direction of movement of the blank whereby continued forward movement of the blank initially opens the carton.

8. In mechanism for removing flattened tubular carton blanks from a stack and opening, reflattening, squaring and conveying same, the improvements comprising a movable and controllable suction means for grasping the end blank of a stack at an area inwardly of one edge of the flattened blank so that a portion of the blank projects beyond opposite sides of the grasping area, means for moving the suction means toward and away from the stack to move the successive end blanks forwardly of the stack, a movable bending bar movable with the suction means, means for moving said bending bar during movement of the suction means so that the bar engages behind the blank at one side of the grasped area to bend the engaged portion of the blank forwardly of the plane of the grasped area in relation to the direction of movement of the blank whereby the blank is effectively pre-opened.

9. In mechanism for removing flattened tubular carton blanks from a magazine containing a stack of blanks and opening, reversely reflattening, squaring and conveying the same, the improvements comprising swingable and controllable suction means movable through an arc about an axis parallel to the plane of the flattened blanks and to one side of the magazine for grasping successive end blanks on the front side thereof at an area inwardly of the edge thereof that is adjacent the said axis for removing the blanks from the magazine, movable means for engaging the rear side of the blank for deflecting the portion of the grasped blank that is between the grasped area and the said edge forwardly of the grasped area with relation to the direction of movement of the blank and said movable means being mounted for bodily movement with said suction means whereby the blank is effectively pre-opened.

10. A mechanism as defined in and by claim 9, and stationary abutments means in the path of movement of the grasped blank for engaging that portion of the blank on the opposite side of the grasped area to deflect the same in a direction opposite the forward direction of movement of the blank whereby continued forward movement of the suction means initially opens the carton.

11. A mechanism as defined in and by claim 10, in which each blank is of the type embodying opposite narrow and wide panels which in flattened condition lie adjacent one another on the front and rear sides of the plane of the flattened blank, said suction means grasping the narrow panel on the front side of the plane of the flattened blank, said abutment means including a supporting ledge for supporting the narrow panel opposite the grasped panel when the carton is initially open and at least one movable pressure roll mounted for bodily movement toward and away from the initially open carton and engageable with the first mentioned narrow panel after release of the suction to reversely reflatten the blank.

12. A mechanism as defined in and by claim 11 in which lever means carry the pressure roll and support the same for swinging movement about an axis parallel to the axis of swing of the suction means and in advance of the path of movement of the suction means, elastic stop means carried by the lever means for cooperation with the wide panel that is adjacent the now released narrow panel and which wide panel in the original flattened condition of the blank was on the rear side of the plane of the flattened blank and said stop means preventing the opened carton resuming its original flattened condition.

13. A mechanism as defined in and by claim 12 and a driven conveying roll means, said lever means swinging the pressure roll through an arc sufficient to press the reflattened blank against said conveying roll means, another roll means adjacent the perimeter of the conveying roll means and beneath which the flattened blank is passed by said conveying roll means and conveyor means spaced from said conveying roll means for receiving blanks therefrom whereby in passage to said conveyor means each blank automatically sets itself up.

References Cited in the file of this patent

UNITED STATES PATENTS

| | | |
|---|---|---|
| 2,241,817 | Howard | May 13, 1941 |
| 2,611,299 | Rose et al. | Sept. 23, 1952 |
| 2,671,385 | Johenning et al. | Mar. 9, 1954 |